US 6,630,418 B2

(12) United States Patent
Sempolinski

(10) Patent No.: US 6,630,418 B2
(45) Date of Patent: Oct. 7, 2003

(54) FUSED SILICA CONTAINING ALUMINUM

(75) Inventor: Daniel R. Sempolinski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/034,971

(22) Filed: Dec. 21, 2001

(65) Prior Publication Data

US 2003/0119650 A1 Jun. 26, 2003

(51) Int. Cl.$^7$ .................................................. C03C 3/06

(52) U.S. Cl. ...................................................... 501/54

(58) Field of Search ....................... 501/53, 54; 359/352; 65/17

(56) References Cited

U.S. PATENT DOCUMENTS

| | | | |
|---|---|---|---|
| 5,395,413 A | 3/1995 | Sempolinski | 65/414 |
| 5,696,624 A | 12/1997 | Komine et al. | 359/350 |
| 6,205,818 B1 | 3/2001 | Seward, II | 65/33.2 |
| 6,235,669 B1 | 5/2001 | Antczak et al. | 501/133 |
| 6,291,377 B1 * | 9/2001 | Komine et al. | 501/54 |
| 6,410,192 B1 * | 6/2002 | Priestley et al. | 430/5 |

FOREIGN PATENT DOCUMENTS

| | | | |
|---|---|---|---|
| EP | 0 921 104 A1 | 6/1999 | C03C/3/06 |
| EP | 0 401 845 B2 | 4/2001 | G02B/1/00 |
| GB | 1520587 | 8/1978 | C03C/3/06 |
| JP | 10-53432 * | 2/1998 | |
| JP | 10-167735 | 6/1998 | C03B/8/04 |
| WO | WO 98/39496 | 9/1998 | C23C/16/40 |

OTHER PUBLICATIONS

Machine Translation of JP 10–53432.*
G. H. Sigel, Jr., Ultraviolet Spectra of Silicate Glasses: A Review of Some Experimental Evidence, Journal of Non–Crystalline Solids, 13 (1973/74) 372–398.
Charlene M. Smith et al., Transient absorption in Excimer–Exposed Silica, Applied Optics, vol. 39, No. 31, Nov. 1, 2000, pp. 5778–5784.
K. Saito et al., Effects of Aluminum Impurity On The Structrual Relaxation In Silica Glass, , Journal of Non–Crystalline Solids 270 (2000) 60–65.
Paul Schermerhorn, Excimer Laser Damage Testing of Optical Materials, Corning Incorporated, SPIE, vol. 1835 Excimer Lasers (1992), pp. 70–79.
Vol. 4 of Studies in Radiation Effects in Solids, edited by G.J. Dienes andL.T. Chadderton (Gordon and Breach, 1975) pp. 91–102 (no month available).
Akira et al., Heat–resistant synthetic quartz products, 6001 Chemical Abstracts 115(1991)Oct. 7, No. 14, Columbus, OH, US.
Utsunomiya Akira, Patent Abstracts of Japan, vol. 2000, No. 9, Oct. 13, 2000, JP 2000 169163, Mitsubishi Chemical Corp. Jun. 20, 2000.
Suzuki Masayuki, Patent Abstracts of Japan, vol. 1996, No. 6, Jun. 28, 1996, JP 08 040737, Shin Etsu Chem Co. Ltd. Feb. 13, 1996.

* cited by examiner

*Primary Examiner*—David Sample
*Assistant Examiner*—Elizabeth A. Bolden
(74) *Attorney, Agent, or Firm*—Scott S. Servilla; Timothy M. Schaeberle

(57) ABSTRACT

Fused silica articles containing at least 50 ppb aluminum are disclosed. The fused silica articles containing these levels of aluminum exhibit improved internal transmission and decreased absorption change when irradiated with a laser when compared with fused silica articles containing lower levels of aluminum.

7 Claims, 3 Drawing Sheets

FUSED SILICA CONTAINING ALUMINUM

FIELD OF THE INVENTION

This invention relates to fused silica and optical members made from fused silica. More particularly, the invention relates to fused silica and optical members made from fused silica containing increased levels of aluminum.

BACKGROUND OF THE INVENTION

As practiced commercially fused silica optical members such as lenses, prisms, filters, photomasks, reflectors, etalon plates and windows, are typically manufactured from bulk pieces of fused silica made in large production furnaces. Bulk pieces of fused silica manufactured in large production furnaces are known in the art as boules or ingots. Blanks are cut from boules or ingots, and finished optical members are manufactured from glass blanks, utilizing manufacturing steps that may include, but are not limited to cutting, polishing, and/or coating pieces of glass from a blank. These optical members are used in various apparatus employed in environments where they are exposed to high-power ultra-violet light having a wavelength of about 360 nm or less, for example, an excimer laser beam or some other high-power ultraviolet laser beam. The optical members are incorporated into a variety of instruments, including lithographic laser exposure equipment for producing highly integrated circuits, laser fabrication equipment, medical equipment, nuclear fusion equipment, or some other apparatus which uses a high-power ultraviolet laser beam.

In overview, boules are manufactured by reacting silicon-containing gas molecules in a flame to form silica soot particles. The soot particles are deposited on the hot surface of a rotating or oscillating body where they consolidate to the glassy solid state. In the art, glass making procedures of this type are known as vapor phase hydrolysis/oxidation processes, or simply as flame deposition processes. The term "boule" is used herein with the understanding that the term "boule" includes any silica-containing body formed by a flame deposition process.

Boules typically having diameters on the order of five feet (1.5 meters) and thicknesses on the order of 5–10 inches (13–25 cm) and larger can be routinely produced in large production furnaces. Multiple blanks are cut from such boules and used to make the various optical members referred to above. The principal optical axis of a lens element made from such a blank will also generally be parallel to the boule's axis of rotation in the furnace. For ease of reference this direction will be referred to as the "axis 1" or use "axis". Measurements made in a direction perpendicular to the axis 1 or use axis will be referred to as "off-axis" measurements.

As the energy and pulse rate of lasers increase, the optical members which are used in conjunction with such lasers, are exposed to increased levels of laser radiation. Fused silica members have become widely used as the manufacturing material of choice for optical members in such laser-based optical systems due to their excellent optical properties and resistance to laser induced damage.

Laser technology has advanced into the short wavelength, high energy ultraviolet spectral region, the effect of which is an increase in the frequency (decrease in wavelength) of light produced by lasers. Of particular interest are short wavelength excimer lasers operating in the UV and deep UV (DUV) wavelength ranges, which includes lasers operating at about 193 nm and 248 nm wavelengths. Excimer laser systems are popular in microlithography applications, and the shortened wavelengths allow for increased line densities in the manufacturing of integrated circuits and microchips, which enables the manufacture of circuits having decreased feature sizes. A direct physical consequence of shorter wavelengths (higher frequencies) is higher photon energies in the beam due to the fact that each individual photon is of higher energy. In such excimer laser systems, fused silica optics are exposed to high energy photon irradiation levels for prolonged periods of time resulting in the degradation of the optical properties of the optical members.

It is known that laser-induced degradation adversely affects the performance of fused silica optical members by decreasing light transmission levels altering the index of refraction, altering the density, and increasing absorption levels of the glass. Over the years, many methods have been suggested for improving the optical damage resistance of fused silica glass. It has been generally known that high purity fused silica prepared by such methods as flame hydrolysis, CVD-soot remelting process, plasma CVD process, electrical fusing of quartz crystal powder, and other methods, are susceptible to laser damage to various degrees.

One of the known methods for reducing absorption levels and improved transmission in the glass is to reduce total metal impurity levels of metals such as sodium, aluminum, and iron. In the past, fused silica glass has been manufactured and sold by the assignee of the present invention having aluminum impurity as high as 50 parts per billion (ppb), sodium levels as high as 100 ppb, and an internal transmission of no greater than 99.4%/cm at 193 nm. One known way of reducing metals impurities in the glass involves treating the refractory materials used in the fused silica production furnace with a halogen gas. Further details on this method are described in U.S. Pat. No. 6,174,509. Another known method of improving the transmission and durability of fused silica optical members is disclosed in U.S. Pat. No. 6,174,830, which discloses annealing silica glass members for 10 or more hours at 1000° C. so that the hydrogen content of the member is $5 \times 10^{18}$ molecules/cm$^3$ or less. While the method in U.S. Pat. No. 6,174,830 is advantageous in that it produces optical members having excellent properties, the annealing process takes a considerable amount of time and expense to produce such members after formation of the boule.

Fused silica members can also exhibit transient absorption. As described in the article "Transient absorption in excimer-exposed silica," by Charlene Smith, Nicholas Borrelli and Roger Araujo, Applied Optics, Vol. 39, No. 31, 5778–5784 (Nov. 1, 2000), the contents of which are incorporated herein by reference, transient absorption can take two forms. In one form, the transmittance of glass in the UV region recovers somewhat when the irradiation source is removed and redarkens quickly when reexposed to light. In the second form, absorption occurs upon the initial irradiation of the glass, and this absorption decreases with constant illumination of the optical member. This type of transient absorption will be referred to herein as the "absorption spike." This absorption spike is problematic in that to avoid the undesirable effects of absorption changes in an optical member, a manufacturer of optical equipment such as a stepper lens machines must expose the optical members to a sufficient number of pulses to "work through" the absorption spike and reduce to the absorption value. This exposure process requires optical equipment manufacturers to devote time and resources to "work through" the absorption spike to reduce absorption to an acceptable level.

It would be desirable to provide a fused silica glass articles that exhibited improved transmission and a decreased absorption spike. It would be advantageous if such fused silica glass articles could be provided without having to resort to expensive and time consuming treatments such as annealing or prolonged irradiation after formation of the glass boules or blanks used to make fused silica optical members.

SUMMARY OF THE INVENTION

The invention relates to fused silica glass articles. As used herein, the term "fused silica glass article" includes the boule or the bulk piece of fused silica produced in a furnace, blanks cut from a boule, and fused silica optical members manufactured from blanks of fused silica. The production of fused silica optical members may involve finishing steps including, but not limited to cutting, grinding, polishing and/or coating the piece of fused silica glass. According to one embodiment of the present invention, fused silica articles are provided having high resistance to optical damage by ultraviolet radiation in the ultraviolet wavelength range, particularly in the range between 190 and 300 nm. In one embodiment of the invention, the fused silica glass articles of the present invention contain at least about 50 ppb of aluminum and have a minimum internal transmission of 99.5%/cm at a wavelength of 193 nm. In one embodiment, the aluminum is doped into the fused silica glass article. According to another embodiment, the amount of aluminum present in the optical member is greater than about 100 ppb, and in another embodiment, the aluminum is present in an amount between about 200 and 400 ppb.

In other embodiments, the minimum internal transmission of the glass articles is greater than or equal to 99.65%/cm at a wavelength of 193 nm. In certain embodiments, glass articles are produced that have a minimum internal transmission greater than or equal to 99.75%/cm at a wavelength of 193 nm.

The fused silica articles of the present invention also exhibit a lowered absorption change when compared with fused silica articles containing aluminum at less than 50 ppb levels. Fused silica articles in accordance with the present invention exhibit an absorption change less than about 0.0006/cm (base 10) when irradiated with a 193 nm laser having a fluence of at least about 0.97 mJ/cm$^2$/pulse. In a preferred embodiment, the fused silica articles of the present invention exhibit an absorption change less than about 0.0005/cm (base 10) when irradiated with a 193 nm laser having a fluence of at least about 0.97 mJ/cm$^2$/pulse. In one preferred embodiment, glass articles are provided that exhibit an absorption change less than about 0.0002/cm (base 10) when irradiated with a 193 nm laser having a fluence of at least 0.97 mJ/cm$^2$/pulse.

The fused silica articles of the present invention enable the production of lens systems exhibiting lower absorption levels within lens systems used in photolithographic equipment. The fused silica articles of the present invention also exhibit improved transmission compared to prior art fused silica articles.

Additional advantages of the invention will be set forth in the following detailed description. It is to be understood that both the foregoing general description and the following detailed description are exemplary and are intended to provide further explanation of the invention as claimed.

DETAILED DESCRIPTION

Figure 1:
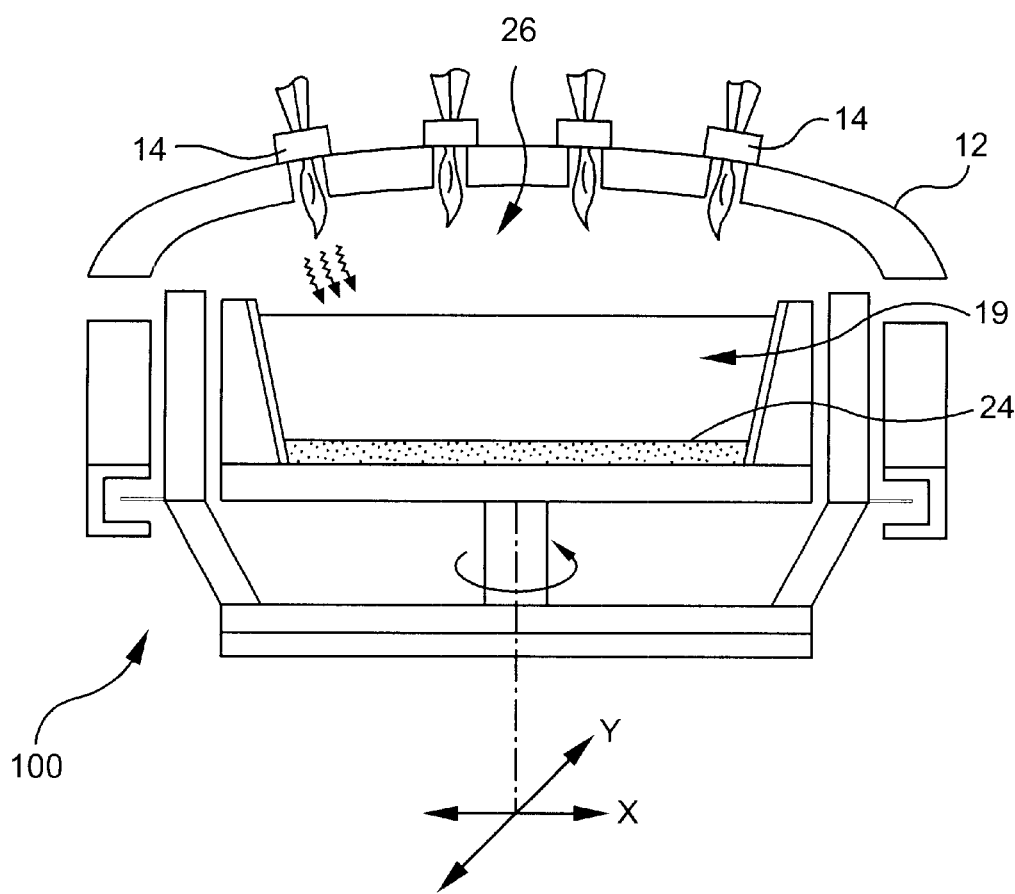
FIG. 1 is a schematic drawing of a furnace used to produce fused silica optical articles in accordance with the present invention.

According to the present invention, fused silica articles having improved transmission and/or reduced absorption change are provided. The fused silica articles of the present invention includes boules, blanks cut from boules and finished optical members cut and processed from fused silica blanks.

The fused silica articles can be made by the fused silica boule process. In a typical fused silica boule process, a process gas, for example, nitrogen, is used as a carrier gas and a bypass stream of the nitrogen is introduced to prevent saturation of the vaporous stream. The vaporous reactant is passed through a distribution mechanism to the reaction site where a number of burners are present in close proximity to a furnace crown. The reactant is combined with a fuel/oxygen mixture at the burners and combusted and oxidized at a glass temperature greater than 1700° C. In a preferred aspect, aluminum is introduced into the reactant stream such that the boule produced by the furnace contains an amount of aluminum greater than the impurity level normally present in the boule. Preferably, the amount of aluminum present in the boule is greater than about 50 part per billion (ppb), more preferably, the amount of aluminum present is greater than about 100 ppb, in a highly preferred embodiment, the amount of aluminum doped into the boule is between about 200 and 400 ppb. A preferred method and apparatus for introducing the aluminum into the reactant stream is disclosed in co-pending and commonly assigned United States patent application entitled "Method and Apparatus for Adding Metals to Fused Silica," naming William Peters, Daniel Sempolinski, Merrill Sproul, and Michael Wasilewski as inventors. It will be understood, however, that the present invention is not limited to a particular method or apparatus of introducing aluminum into fused silica articles, and other methods and apparatus can be used. Furthermore, the present invention is not limited to introducing aluminum into fused silica by an external source, and in some embodiments, the aluminum may be incorporated into the fused silica article during the fused silica manufacturing process. For example, aluminum can be incorporated into fused silica articles by using refractories containing high aluminum impurities in the fused silica manufacturing furnace, which can diffused into the fused silica article during the manufacturing process. Continuing with a description of the boule manufacturing process, the high purity metal oxide soot containing aluminum and the heat produced by the multiple burners is directed downward through the refractory furnace crown where it is immediately deposited and consolidated to a mass of glass on a hot collection surface such as bait material.

In one particularly useful embodiment of the invention, an optical article having high resistance to laser damage is formed by:

a) producing a gas stream containing a silicon-containing compound in vapor form capable of being converted through thermal decomposition with oxidation or flame hydrolysis to silica;

b) introducing aluminum into the gas stream;

c) passing the gas stream into the flame of a combustion burner to form amorphous particles of fused silica containing aluminum;

d) depositing the amorphous particles onto a support; and d) consolidating the deposit of amorphous particles into a transparent glass body.

Useful silicon-containing compounds for forming the glass boule preferably include any halide-free cyclosiloxane compound, for example, polymethylsiloxane such as hexamethyldisiloxane, polymethylcyclosiloxane, and mixtures of these. Examples of particularly useful polymethylcyclosiloxanes include octamethylcyclotetrasiloxane. decamethylcyclopentasiloxane, hexamethylcyclotrisiloxane, and mixtures of these.

In one particularly useful method of the invention, halide-free, cyclosiloxane compound such as octamethylcyclotetrasiloxane (OMCTS), represented by the chemical formula—$[SiO(CH_3)_2]_4$—, is used as the feedstock for the fused silica boule process, or in the vapor deposition processes such as used in making high purity fused silica for optical waveguide applications.

As practiced commercially, boules having diameters on the order of five feet (1.5 meters) and thicknesses on the order of 5–10 inches (13–25 cm) and greater can be produced using furnaces of the type shown in FIG. 1. In brief overview, furnace 100 includes a furnace chamber 26 and a crown 12 which carries a plurality of burners 14 which produce silica soot which is collected on a collection surface 24 to form boule 19, which, as noted above, are typically on the order of five feet in diameter. Further details on the structure and operation of furnaces of this type may be found in commonly assigned U.S. Pat. No. 5,951,730, the entire contents of which are incorporated herein by reference. Particular details on burner configurations for making fused silica boules may be found in commonly-assigned PCT patent publication number WO 00/17115.

Applicants have surprisingly discovered that fused silica articles containing aluminum in an amount greater than the normal aluminum impurity level present greatly improved several properties of such members. Typically, fused silica articles contain total metals impurities less than 100 ppb. These metal impurities typically include alkalis, alkali earths, iron, zirconium, titanium and copper. In a typical fused silica article made by the assignee of the present invention, metal impurities such as sodium and iron are less than 10 ppb each, and aluminum impurity levels are less than 20 ppb. In the past, however, fused silica articles have been produced by the assignee of the present invention having higher impurity levels. For example, aluminum impurities as high as 50 ppb were observed in fused silica article produced by the assignee of the present invention, and other metal impurities were higher than the levels presently produced (e.g. sodium levels up to 100 ppb) resulting in fused silica articles having an internal transmission no greater than 99.4%/cm at 193 nm. However, according to one embodiment of the present invention, aluminum including in the fused silica articles in an amount exceeding the normal impurity level, while the other metals impurities are maintained at present lower levels. In one embodiment, the amount of aluminum in the member is greater than about 50 ppb. In a preferred embodiment, the aluminum present in the article exceeds about 100 ppb. In a highly preferred embodiment, the amount of aluminum is between about 200 ppb and 500 ppb.

The ability to provide fused silica articles with higher aluminum content results in manufacturing processes that require less stringent measures for controlling aluminum impurity levels in furnaces used to make these glass articles. As such, the manufacturing process is therefore more flexible and robust with respect to the quality of the furnace refractories and the chemical precursors used to produce fused silica articles. Refractory or chemical precursor changes can be made to lower cost and/or improve furnace performance without degradation of optical properties. However, it is preferable to use fused silica manufacturing furnaces having the highest purity refractories available to avoid other undesirable metal contaminants such as iron and sodium. In one preferred embodiment of the invention, the furnace refractories should contain less than 2 ppm of sodium and less than 5 ppm of iron so as to maximize ArF transmission. Refractories containing low levels of impurities can be obtained by utilizing the halogen gas treatment process disclosed in U.S. Pat. No. 6,174,509.

The fused silica optical boules used to make optical members of the present invention can be made using either chlorine-containing or chlorine-free chemical precursors. There are, however, advantages to using chlorine-free precursors in that the resulting low-chlorine glasses can retain higher metal concentrations without loss of UV transmission.

In another embodiment of the invention, applicants have discovered that especially good ArF transmission and damage resistant fused silica glass can be made by introducing aluminum to the fused silica glass during the boule production process and slowly cooling the boule after manufacture. According to conventional fused silica boule manufacturing processes, boules are cooled from a temperature of about 1850° C. to 1100° C. in less than 30 minutes. However, according to one embodiment of the present invention, fused silica boules containing increased aluminum introduced during the boule manufacture process are cooled from about 1850° C. to about 1100° C. in about five hours or more.

Figure 2:
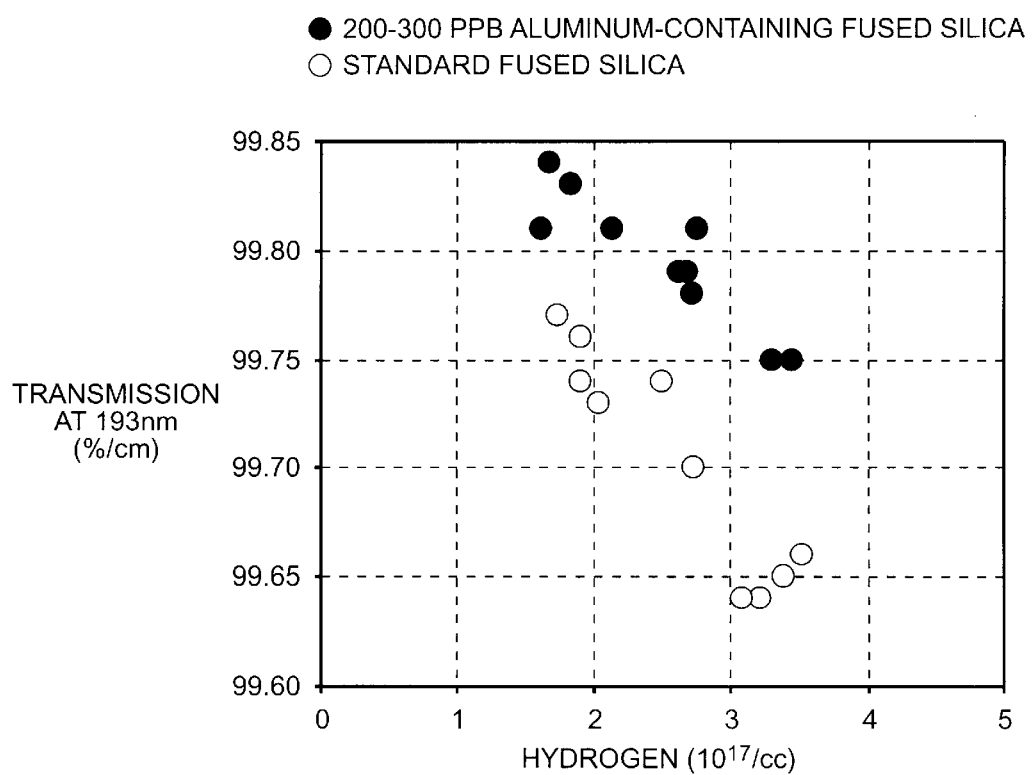
FIG. 2 is a graph showing transmission of fused silica articles containing increased levels of aluminum compared with prior art fused silica optical members irradiated with a laser at 193 nm.

Measurement of internal transmission of fused silica articles was performed as follows. In unexposed fused silica, the internal transmittance is determined using a suitable UV spectrophotometer (e.g., Hitachi U4001) on optically polished samples. The internal transmittance ($T_i$) is determined by the measured transmission through the sample, divided by the theoretical transmission of such a sample as determined by surface reflections and then normalized to a 10 mm path length. The minimum internal transmission of fused silica members produced in accordance with the present invention and irradiated with 193 radiation exceeded 99.5%/cm, and some glasses exceeded 99.65%/cm and 99.75%/cm. Referring to FIG. 2, which is a graph showing the transmission of a prior art fused silica article containing levels of aluminum in the "less than 10 ppb" range versus the transmission of a fused silica article containing approximately 300 ppb of aluminum. The y axis represents the transmission in %/cm, and the x-axis represents the amount of hydrogen contained in the article. As shown in FIG. 2, the transmission of the fused silica article containing 300 ppb of aluminum and $2 \times 10^{17}/cm^3$ of hydrogen exhibited an internal transmission exceeding 99.80%/cm, compared with values typically around 99.75%/cm for undoped fused silica articles containing similar levels of hydrogen.

Absorption change in fused silica articles was measured using a 2000 Hz ArF laser to provide exposure conditions very similar to those in leading ArF lithographic systems and allows samples to be exposed to large numbers of pulses in a short time. The exposure and measurement system was installed on a vertical optical bench according to techniques known in the art.

Figure 3:
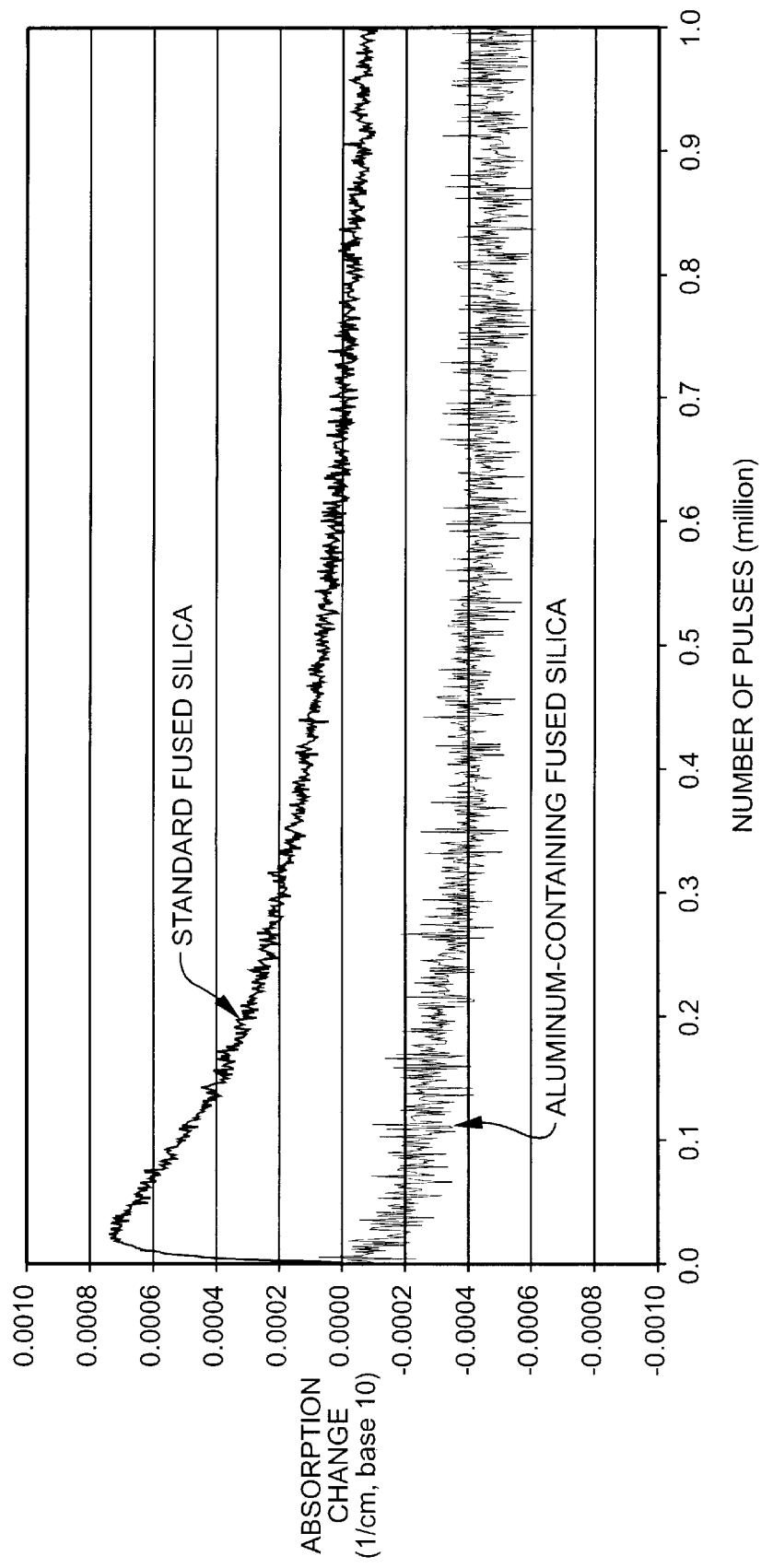
FIG. 3 is a graph comparing the change of absorption for a prior art fused silica article and a fused silica optical article containing aluminum levels exceeding 300 ppb.

FIG. 3 shows absorption change measurements for two fused silica samples that were irradiated with about one million pulses. The first sample was a fused silica sample containing $2.6 \times 10^{17}/cm^3$ of hydrogen and low, less than 10 ppb, levels of aluminum irradiated with an ArF laser at a fluence of 0.99 mJ/cm$^2$/pulse. This sample shows an absorption spike upon initial exposure, wherein the sample exhibits an absorption change exceeding 0.007/cm (base 10). The absorption spike is observed during the first 100,000 pulses. The second sample, which was a fused silica sample containing approximately 300 ppb of aluminum and $1.73 \times 10^{17}/cm^3$ of hydrogen. This sample was irradiated with an ArF laser at a fluence of 0.97 mJ/cm$^2$/pulse. This sample exhibited virtually no absorption spike when compared to the low aluminum-containing sample. In particular, the absorption change is less than about 0.0001/cm (base 10), which is a significant reduction in the absorption spike observed for the undoped sample.

It will be apparent to those skilled in the art that various modifications can be made to the present invention without departing from the spirit or scope of the invention. Thus, it is intended that the present invention covers modifications and variations of this invention provided they come within the scope of the appended claims and their equivalents.

What is claimed is:

1. A fused silica glass article resistant to optical damage from ultraviolet radiation in the wavelength range between 190 and 300 nm and containing aluminum in an amount greater than 100 ppb and having a minimum internal transmission greater than or equal to 99.65%/cm at a wavelength of 193 nm.

2. The fused silica article of claim 1, wherein the member has a minimum internal transmission greater than or equal to 99.75%/cm at a wavelength of 193 nm.

3. The fused silica article of claim 1, wherein the article exhibits an absorption change less than 0.0006/cm (base 10) when irradiated with a 193 nm laser having a fluence of at least 0.97 mJ/cm$^2$/pulse.

4. The fused silica article of claim 1, wherein the article exhibits an absorption change less than 0.0005/cm (base 10) when irradiated with a 193 nm laser having a fluence of at least 0.97 mJ/cm$^2$/pulse.

5. The fused silica article of claim 1, wherein the article exhibits an absorption change less than 0.0002/cm (base 10) when irradiated with a 193 nm laser having a fluence of at least 0.97 mJ/cm$^2$/pulse.

6. The fused silica glass article of claim 1, wherein the aluminum is present in an amount between 200 and 400 ppb.

7. The fused silica glass article of claim 3, wherein the article has a minimum internal transmission greater than or equal to 99.75%/cm at a wavelength of 193 nm.

* * * * *